United States Patent [19]

Hallbach

[11] Patent Number: 5,007,504
[45] Date of Patent: Apr. 16, 1991

[54] LUBRICATION APPARATUS AND METHOD

[75] Inventor: Raymond L. Hallbach, Simpsonville, S.C.

[73] Assignee: Cincinnati Milacron Inc., Cincinnati, Ohio

[21] Appl. No.: 507,080

[22] Filed: Apr. 10, 1990

[51] Int. Cl.⁵ ............................................. F16N 21/00
[52] U.S. Cl. ........................................... 184/8; 184/5; 184/6.26; 384/474
[58] Field of Search ................. 184/5, 5.1, 6.26, 55.1, 184/8; 384/473, 474; 29/898.1, 527.1; 264/261, 267

[56] References Cited

U.S. PATENT DOCUMENTS

| | | | |
|---|---|---|---|
| 1,012,018 | 12/1911 | Sargent | 384/473 |
| 1,432,557 | 10/1922 | Hollomon | 184/5 |
| 2,283,371 | 5/1942 | Norelius | 384/473 |
| 2,671,701 | 3/1954 | Duncan | 384/473 |
| 2,855,250 | 10/1958 | Peycke, Jr. | 384/474 |
| 3,746,129 | 7/1973 | Knapp et al. | 184/6.26 |
| 4,407,770 | 10/1983 | Ripoll | 264/261 |
| 4,759,427 | 7/1988 | Onose et al. | 184/6.26 |
| 4,858,980 | 8/1989 | Dreisig et al. | 294/99.1 |

OTHER PUBLICATIONS

Brochure, Publication No. M-5287-1, dated Mar., 1988 of Cincinnati Milacron Marketing Company.
Brochure, of NSK (Nippon Seiko, KK), dated Jul., 1985.

Primary Examiner—Ira S. Lazarus
Assistant Examiner—Alan B. Cariaso
Attorney, Agent, or Firm—Thomas M. Farrell

[57] ABSTRACT

A machine assembly has mist or migration lubrication distributed by an air stream from a supply site to remotely spaced bearings. An elongate clearance hole is drilled within a wall of the machine member, and cross-drilling is provided to interconnect the supply site and bearings with the clearance hole. A flexible conduit is closely-fitted to the cross-drilled holes, the conduit being bent through a smooth curve. A hardenable material is flowed into the clearance hole to cement the tubing in position, to thereby provide a smooth transition path for conveying air and lubricant from the supply site to the bearing.

8 Claims, 2 Drawing Sheets

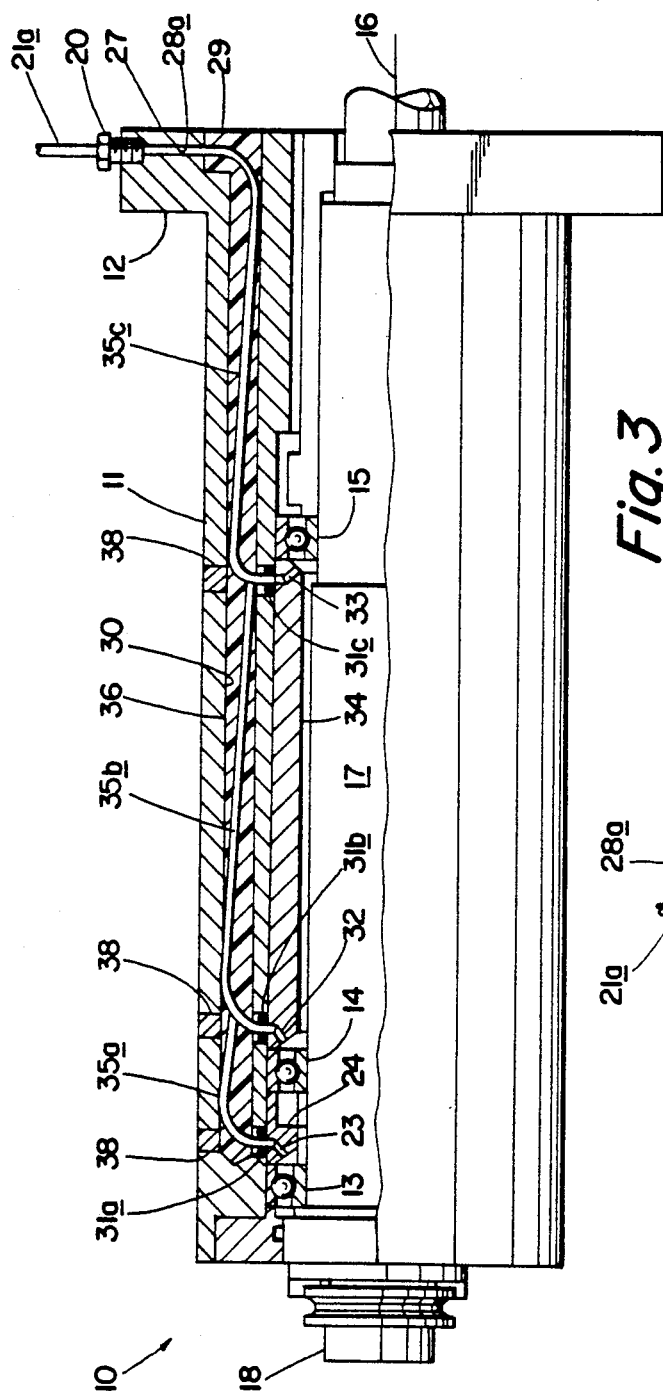
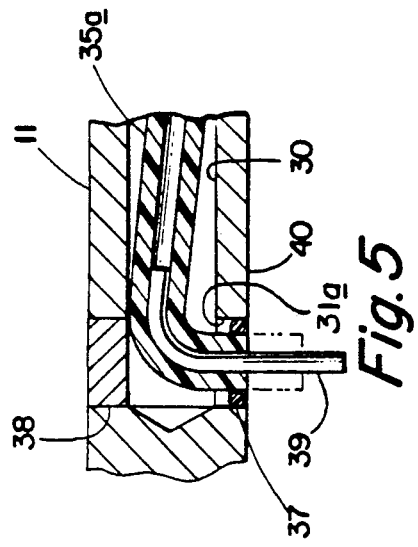
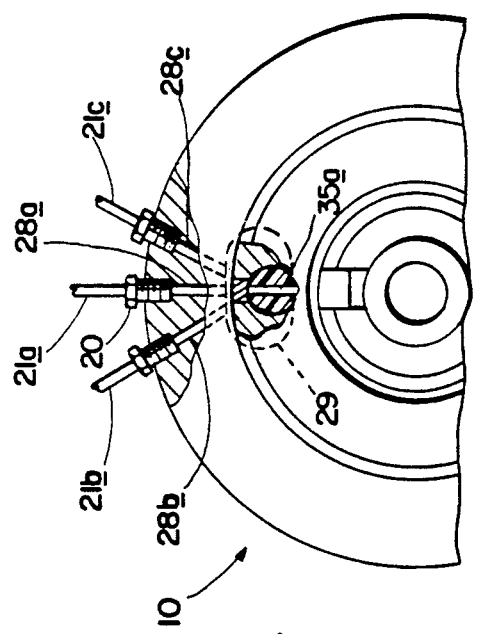

LUBRICATION APPARATUS AND METHOD

FIELD OF INVENTION

The invention relates to both mist and migration lubrication systems having passages for the flow of metered air and lubricant to a machine member.

BACKGROUND OF THE INVENTION

Mist lubrication consists of finely-dispersed atomized oil carried in an air stream. Migration lubrication consists of an air stream flowing through a conduit where, periodically, an oil droplet is injected into the conduit. The liquid oil droplet wets the inside wall of the conduit and thins to an oil film as it migrates along the wall to its destination. The purpose of both systems is to lubricate and cool machine elements such as ball bearings.

In machine assemblies employing spindle designs with multiple spaced bearings, where mist or migration lubricant is to be distributed to the bearings from a remote lubrication supply site, the usual practice is to drill very deep small-diameter holes within a machine housing to reach each bearing. These long small-diameter holes ar hard to machine, since a lone small-diameter drill tends to "walk" from its intended path. Additionally, in a great many cases, right-angle holes are also required to redirect lubricant toward the bearings from the long supply hole. Right-angled intersections can cause burrs which are hard to remove, and can cause the lubricant to reclassify and puddle, which results in unpredictable flow and improper distribution to bearings; these lubrication problems may cause failures in high speed bearing applications.

SUMMARY OF THE INVENTION

It is an object of the present invention to obviate the requirement for deep small-diameter hole drilling in a mist lubrication system.

Another object of the present invention is to provide, in a machine member, a smooth path from a mist or migration lubrication supply site to a remotely located bearing, where the path may be nonlinear, and where the tendency for lubrication puddling is substantially lessened.

In accordance with the objects, the invention is shown embodied in a lubrication apparatus for a machine, comprising: an elongate bearing support member having an axis defined along its length; a lubrication supply site proximal one end of the support member; a rotary bearing spaced along the axis from the one end; a conduit extending between the supply site and the bearing, within an elongate clearance hole in a wall of the support, the conduit having at least one bend; and a cementing means for affixing the conduit in position with the support, to thereby provide a smooth, non-linear transition path for conveying air and lubricant from the supply site to the bearing.

BRIEF DESCRIPTION OF THE DRAWINGS

FIG. 3 is a side elevational view, in partial cross-section, of a spindle assembly having an improved lubrication apparatus.

FIG. 4 is a front elevational view, in partial cross-section, of the improved lubrication apparatus of FIG. 3.

FIG. 5 is an enlarged side elevational cross-section of the lubrication apparatus of FIG. 3, illustrating a typical terminus of an installed tubular conduit immediately prior to cementing the conduit in position.

DESCRIPTION OF THE PREFERRED EMBODIMENT

Figure 1:
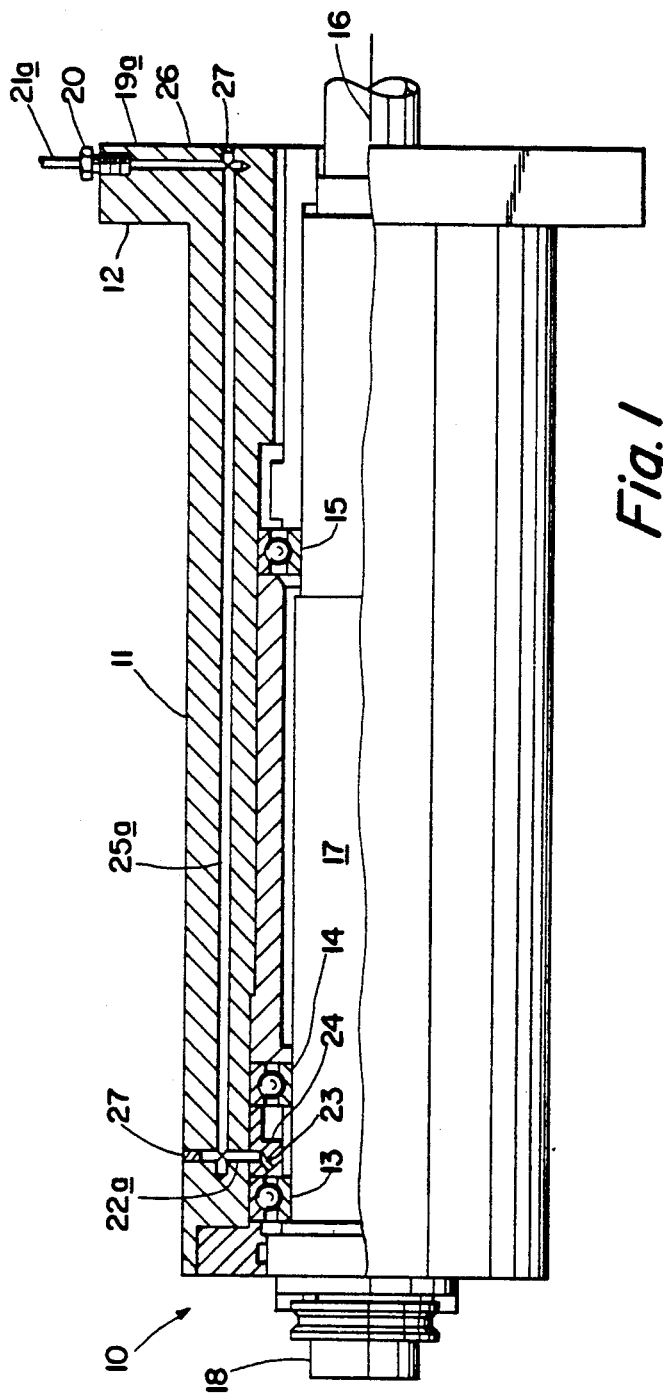
FIG. 1 is a side elevational view, in partial cross-section, of a spindle assembly of the prior art.

Referring to FIG. 1, a cartridge-type spindle assembly 10 is depicted, which may be used on a variety of machines, for example the HPMC machine center manufactured by Cincinnati Milacron Inc., the assignee of the present invention. Such machine is depicted in U.S. Pat. No. 4,858,980, the details of which are incorporated herein by reference.

The spindle assembly 10 is comprised of an elongated cylindrical housing 11 having a flange 12 at one end, which serves to support a plurality of rotary bearings 13, 14, 15 spaced along its central axis 16. The bearings 13, 14, 15 in turn support a rotatable spindle 17 and tool 18, the details of which are unimportant to the present invention, but which are well-known to those skilled in machine design. The flange 12 has a first radially-drilled hole 19a provided with a threadably received fluid fitting 20 at the outer diameter, the fitting 20 serving to connect a supply tube 21a emanating from a remote source of mist or migration lubrication (not shown). A second radially-drilled hole 22a is provided through the main cylindrical diameter of the housing 11 near the front bearing 13, which connects to interdrilling 23 within a bearing spacer 24, which directs the air/lubricant against the front bearing 13. A very long small-diameter hole 25a is drilled from the rear face 26 of the housing 11, to connect the radial holes 19a, 22a. The outer portions of both the deep hole 25a and the second radial hole 22a have plugs 27, to define a lubrication flow path.

Figure 2:
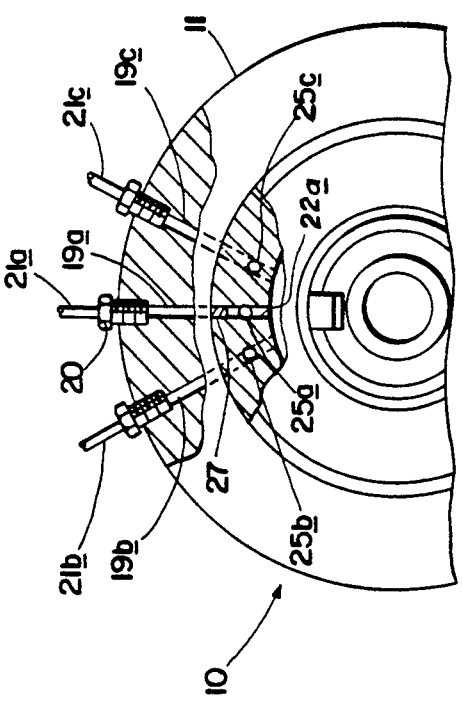
FIG. 2 is a front elevational view, in partial cross-section, of the prior art spindle assembly of FIG. 1.

Referring to FIG. 2, it may be appreciated by those skilled in the art that the remaining two bearings 14, 15 are provided with similar supply lines 21b, c for mist or migration lubrication.

In providing a lubricant path of the prior art, problems are encountered because a long small-diameter drill tends to walk from its intended path while drilling and, in thin-wall housings, a drill may break out or may intercept closely-spaced similar holes, for example, the deep holes 25a, b, c of FIG. 2. Further, sharp right angle intersections of interdrilled holes result in points where pressurized air/lubricant stream may be throttled, which may tend to cause puddling as the atomized oil or migrating oil film reclassifies; internal burrs, difficult to remove, may add to the puddling problem.

The apparatus of FIG. 3 illustrates the same housing assembly 10, with an improved lubrication system. The same supply fittings 20 are utilized to provide lubricant to the three bearings 13, 14, 15, but only a low degree of positioning accuracy is needed when drilling and tapping the supply holes 28a, b, c, for it is only necessary for the supply holes 28a, b, c to break out into an end milled pocket 29 which is machined in the rear face 27 of the housing 11. A single large clearance hole 30 is drilled from the rear face 27 of the housing 11 to a point proximal to the front bearing 13. Three cross holes 31a, b, c are radially-drilled through the main diameter of the housing 11, which interconnect with interdrilling 23, 32, 33 provided in the bearing spacers 24, 34, to direct air/lubricant to the respective bearings 13, 14, 15. Three long flexible tubes 35a, b, c are inserted into the clearance hole 30 and are maneuvered into respective cross holes 31a, b, c and supply holes 28a, b, c to form discrete fluid conduits. The flexible tubes 35a, b, c may be taken from a variety of suitable tubing, for example, Parker Parflex nylon tubing, from Parker Hannifin Corporation, Ravenna, Oh. One suitable size is 0.125 inch (3.2 mm) OD by 0.093 inch (2.4 mm) ID. Once the tubes 35a, b, c are installed, and with the axis 16 vertical, the clearance hole 30 and end-milled pocket 29 are filled from the rear face 26 with a hardenable material 36, such as epoxy. One suitable hardenable material 36 is Diamant DWH 310SL, from Devitt Machine Company, Inc., Media, Pa. Most tubing has among its various properties, a minimum bend radius, i.e. an acceptable radius at which the unsupported tubing will not collapse and will remain open to flow. Thus, in many cases, the clearance hole may simply be of a width approximately equal to the minimum bend radius of the tubing. The tubing mentioned herein has a 0.50 inch (12.7 mm) minimum bend radius.

The supply holes 28a, b, c are sized to fit the tube ends since the pocket 29 affords access for assembly. The cross holes 31a, b, c are oversized to facilitate assembly, and compliant O-rings 37 are slipped over the tube ends to seal in the hardenable material 36. Plugs 38 are pressed into the outer portions of the cross holes 31a, b, c; cross hole 31a being plugged last, to permit air to escape from the clearance hole 30.

With reference to FIG. 5, to insure that the hardenable material 36 will not collapse a pliable thin-walled tube, the inventive system herein further includes an assembly technique where a flexible solid plastic rod 39 may be temporarily inserted within the tubing at its ends, to maintain the opening. After the hardenable material has set up, the flexible rod 39 may be withdrawn and the form will hold. The tubing is then trimmed flush with the housing bore 40. Additionally, in those circumstances where the clearance hole 30 must be made smaller than the minimum bend radius of the tubing due to a constrained wall thickness of the housing, the use of the solid rod 39 will also permit the tubing to be forced into an extremely tight bend radius and maintain the form until the hardenable material 36 has set-up.

It will be appreciated by those skilled in the art that, with slightly more difficulty of assembly, the O-rings 37 may be omitted if the cross holes 31a, b, c are closely-sized to the tubes 35a, b, c to form a seal for the hardenable material 36 when in its flowable state.

While the invention has been shown in connection with a preferred embodiment, there is no intention that the invention be so limited. Rather, the invention extends to all such designs and modifications as come within the scope of the appended claims.

What is claimed is:

1. A lubrication apparatus for a machine, comprising:
   an elongate bearing support member having an axis defined along its length;
   an air stream and lubricant supply site proximal one end of said support member;
   a rotary bearing spaced along said axis from said one end;
   a conduit extending between said supply site and said bearing, within an elongate hole in a wall of said support, said conduit having at least one bend; and
   means for affixing said conduit in position with said support, said conduit providing a smooth, non-linear transition path for conveying an air stream and lubricant from said supply site to said bearing.

2. A lubrication apparatus for a machine, comprising:
   an elongate bearing support member having an axis defined along its length;
   an air steam and lubricant supply site proximal one end of said support member;
   a rotary bearing spaced along said axis from said one end;
   an elongate clearance hole within a wall of said support running approximately from said supply site to said bearing;
   a cross hole proximal said bearing, angled and communicating with said clearance hole; and
   a tubular conduit fitted into said cross hole and extending through said clearance hole from said cross hole to said supply site, said conduit having at least one bend.

3. The lubrication apparatus of claim 2, further including cementing means for affixing said conduit in position with said support, said conduit providing a smooth, non-linear transition path for conveying an air stream and lubricant from said supply site to said bearing.

4. The lubrication apparatus of claim 3, wherein said clearance hole has a width approximately equal to the minimum bend radius of said tubular conduit.

5. A lubrication apparatus for a machine, comprising:
   an elongate bearing support member having an axis defined along its length;
   an air stream and lubricant supply site proximal one end of said support member;
   a rotary bearing spaced along said axis from said one end;
   an elongate clearance hole within a wall of said support running approximately from said supply site to said bearing;
   a first cross hole proximal said bearing, angled and communicating with said clearance hole;
   a second cross hole proximal said supply site, angled and communicating with said clearance hole; and
   a tubular conduit, fitted into said first and second cross holes and extending through said clearance hole, said conduit having at least one bend.

6. The lubrication apparatus of claim 5, further including cementing means for affixing said conduit in position with said support, said conduit providing a smooth, non-linear transition path for conveying an air stream and lubricant from said supply site to said bearing.

7. The lubrication apparatus of claim 5, wherein said first cross hole runs interiorly from said clearance hole and said second cross hole runs exteriorly from said clearance hole.

8. A method for providing a lubrication path in a machine, from an air stream and lubricant supply site proximal one end of a machine member to a remotely-spaced bearing, comprising the following steps:
   providing an elongate clearance hole in a wall of said machine member, running approximately from said supply site to said bearing;
   providing a first cross hole proximal to said bearing, angled and communicating with said bearing and said clearance hole;
   providing a second cross hole proximal to said supply site, angled and communicating with said supply site and said clearance hole;
   locating a tubular conduit within said clearance hole with respective conduit ends in said first and second cross holes, said conduit extending into fluid communication with said supply site and said bearing; and
   affixing said conduit in position by cementing means.

* * * * *